(12) United States Patent
Bohan, Jr.

(10) Patent No.: US 8,108,075 B2
(45) Date of Patent: Jan. 31, 2012

(54) FAILSAFE HVAC CONTROL UPGRADES

(75) Inventor: John E. Bohan, Jr., Avon Lake, OH (US)

(73) Assignee: R.W. Beckett Corporation, North Ridgeville, OH (US)

( * ) Notice: Subject to any disclaimer, the term of this patent is extended or adjusted under 35 U.S.C. 154(b) by 335 days.

(21) Appl. No.: 12/470,720

(22) Filed: May 22, 2009

(65) Prior Publication Data

US 2010/0298980 A1 Nov. 25, 2010

(51) Int. Cl.
*G01M 1/38* (2006.01)
*G05B 13/00* (2006.01)
*G05B 15/00* (2006.01)
*G05D 23/00* (2006.01)

(52) U.S. Cl. ............ 700/276; 700/21; 700/79; 700/277; 700/278; 236/1 C; 236/1 E; 236/1 F; 236/1 R; 165/200; 165/201; 165/205; 165/234

(58) Field of Classification Search .............. 700/21, 700/78–80, 276–278, 299–301; 236/200–201, 236/205, 234, 1 C, 1 E, 1 F, 1 R; 165/200–201, 165/205, 234
See application file for complete search history.

(56) References Cited

U.S. PATENT DOCUMENTS

| | | | | |
|---|---|---|---|---|
| 4,623,969 A | * | 11/1986 | Bensoussan et al. | 700/278 |
| 5,207,379 A | * | 5/1993 | Hurmi et al. | 236/9 R |
| 5,226,818 A | * | 7/1993 | Feiock et al. | 434/226 |
| 5,464,369 A | * | 11/1995 | Federspiel | 454/256 |
| 5,506,768 A | * | 4/1996 | Seem et al. | 700/41 |
| 7,623,413 B2 | * | 11/2009 | McFarland | 367/127 |
| 7,847,681 B2 | * | 12/2010 | Singhal et al. | 340/514 |
| 2006/0009863 A1 | * | 1/2006 | Lingemann | 700/19 |
| 2009/0033513 A1 | * | 2/2009 | Salsbury et al. | 340/825.2 |

* cited by examiner

*Primary Examiner* — Ramesh Patel
(74) *Attorney, Agent, or Firm* — Eschweiler & Associates, LLC

(57) ABSTRACT

A system and method is presented for providing failsafe control in a control system used for receiving and controlling various object or medium properties in a heating, ventilating or air conditioning system. The control system comprises an HVAC controller, configured to receive failsafe data indicative of a safety related property of an object or medium, and to generate a state indicative of a connection status of a failsafe detector with respect to the HVAC controller. The control system further comprises a non-volatile memory, operably coupled to the HVAC controller and configured to store a connection indication indicative of a connection status of the failsafe detector with respect to the HVAC controller, wherein the HVAC controller is configured to generate a control signal based on satisfaction of a predetermined relationship between the generated state and the stored connection indication.

26 Claims, 10 Drawing Sheets

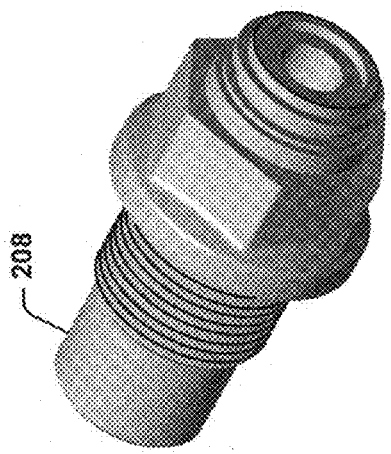
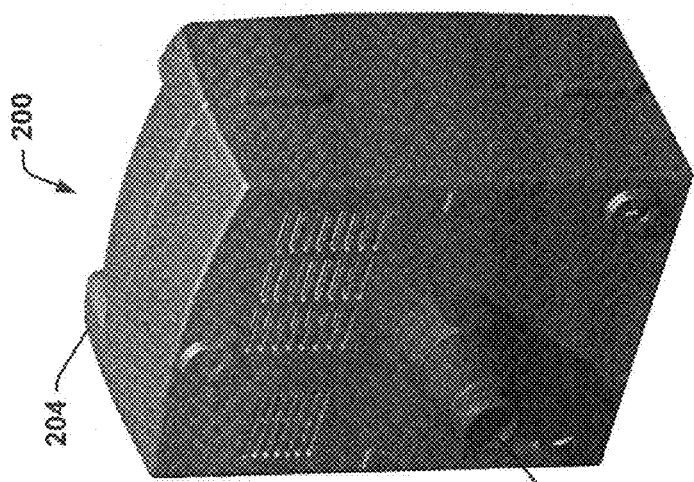
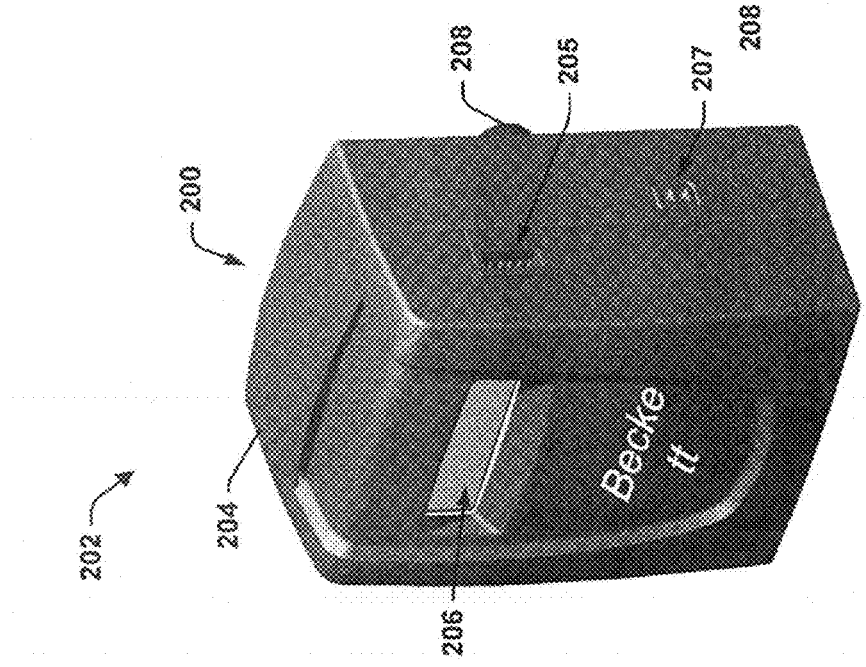
FIG. 2C
FIG. 2B
FIG. 2A

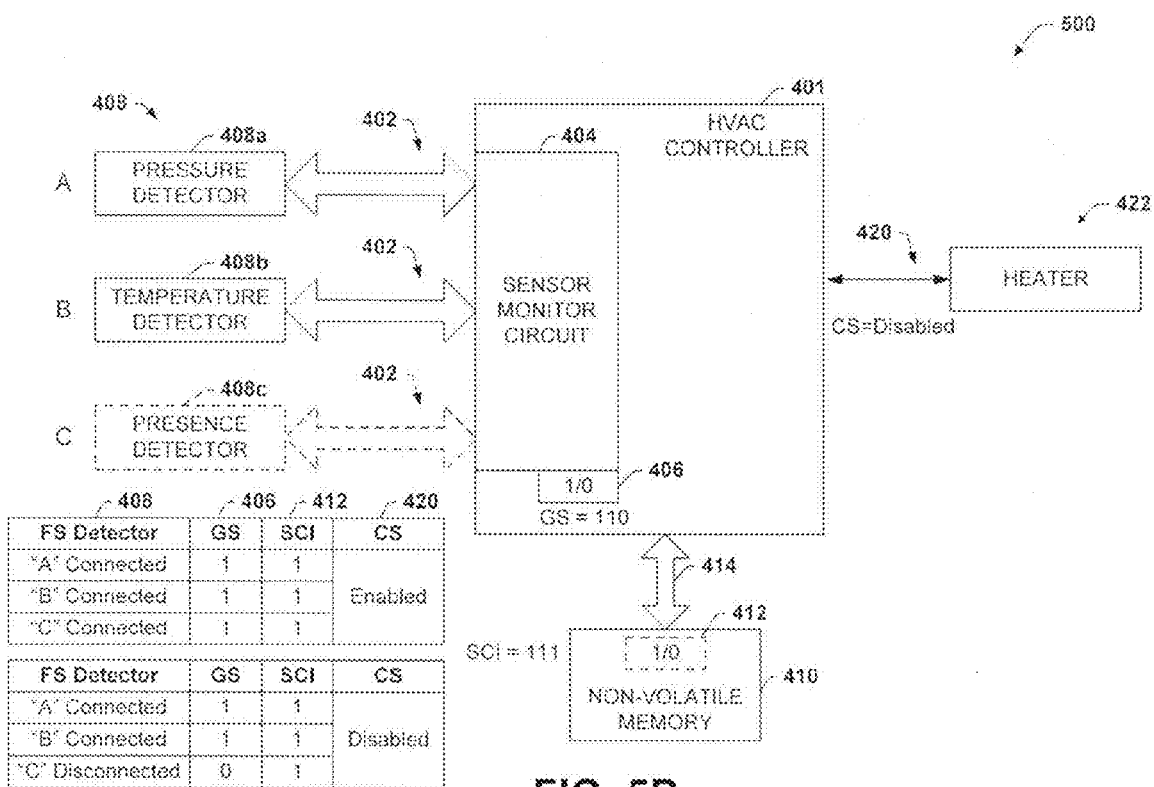

FAILSAFE HVAC CONTROL UPGRADES

FIELD OF INVENTION

The present invention relates generally to HVAC controls and more particularly to systems and methods for providing failsafe control and upgrades to a control system used for detecting and controlling various object or medium properties in heating, ventilating and air conditioning systems, in a failsafe manner.

BACKGROUND OF THE INVENTION

Heating, ventilating and air conditioning (HVAC) systems such as boiler systems employ various methods to control the temperature, pressure and level of a medium, for example, within a pressurized hot water boiler. Another HVAC system such as a furnace may control the temperature of a heat exchanger or another object/component within the furnace. Similarly, air conditioning systems may control the temperature, pressure, flow, direction and presence of a refrigerant medium between the compressor, condenser and evaporator. These properties or conditions of the object or medium being controlled are usually regulated within a particular range in order to maintain safe operation of the respective HVAC system.

Conventionally, multiple HVAC control components may be utilized, for example, together with a boiler controller to monitor a temperature, pressure and/or level of the medium within a boiler and/or within zones associated with the boiler, to monitor a thermostat, or to monitor a presence of water in the boiler. The boiler controller and/or the multiple boiler control components may then use this information to safely control a burner that heats the boiler, a water valve to regulate the water level, and/or a circulator pump to distribute the water throughout the various heated zones.

The sensors or detectors that are used to monitor these various object or medium properties, generally have a portion of the sensor which is exposed to the medium. This exposed portion of the sensor is, for example, often the hottest part of the measurement circuit and may therefore be exposed to the harshest conditions. Moreover, these HVAC sensors are exposed to processes that may increase the likelihood of changes in the electrical properties of the sensor that may cause unexpected or unsafe changes in the properties of the controlled object or medium, and may eventually cause a complete system failure.

In boiler applications, for example, the failure of a temperature sensor or an associated low-water level cutoff (LWCO) detector (or medium presence detector) may cause a boiler malfunction or system failure. Thus, the failure of such HVAC sensors poses a safety problem. Current HVAC control systems may not provide for failsafe operation, should a failure occur to one of the sensors that monitor a safety related property of the object or medium. In addition, present HVAC control systems may not provide failsafe operation of the system if one of these safety related sensors (failsafe detectors) were to be inadvertently removed from the system. For example, if such a safety related sensor were to fail or to otherwise be removed from the control process of a prior art boiler system, the boiler could run out of water and could cause an unsafe system failure or damage to the boiler.

In addition, present HVAC control systems may not provide system safety or alarm information valuable to the user or other such information necessary to maintain continued system operations or to avoid an impending system failure.

Accordingly, to provide failsafe operations and system upgrades, there is a need for an HVAC control system that supports the use of various failsafe detectors and also safely accommodates failsafe detector changes with respect to the HVAC control system.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention is directed to a control system for a heating, ventilating or air conditioning system. The HVAC control system comprises an HVAC controller, configured to receive failsafe data indicative of a safety related property of an object or medium, and to generate a state indicative of a connection status of a failsafe detector with respect to the HVAC controller. The HVAC control system also comprises a non-volatile memory, operably coupled to the HVAC controller and configured to store a connection indication indicative of a connection status of the failsafe detector with respect to the HVAC controller. The HVAC controller is further configured to generate a control signal based on satisfaction of a predetermined relationship between the generated state and the stored connection indication.

In another embodiment of the present invention, a control system for a heating, ventilating or air conditioning system, comprises an HVAC controller, configured to receive failsafe data from a failsafe detector, the failsafe data indicative of a safety related property of a medium associated with the control system, wherein the HVAC controller is configured to generate a state indicative of a connection status of the failsafe detector with respect to the HVAC controller, and wherein the HVAC controller is configured to detect a failure in the failsafe detector and to generate a failure indication therefrom. The HVAC control system also comprises a storage device, operably coupled to the HVAC controller and configured to store a connection indication indicative of a connection status of the failsafe detector with respect to the HVAC controller. The HVAC controller is further configured to generate a control signal based on satisfaction of a logical comparison between the generated state and the stored connection indication, and also based on the failure indication.

In one aspect of the present invention, a method is disclosed for providing failsafe control in an HVAC controller of a control system used for receiving and controlling a failsafe property of an object or medium in a heating, ventilating or air conditioning system. The method comprises receiving failsafe data indicative of a failsafe property of an object or medium using a failsafe detector, and storing in a non-volatile memory a connection indication indicative of a connection status of the failsafe detector with respect to the HVAC controller. The method also includes generating within the HVAC controller a state indicative of a connection status of the failsafe detector with respect to the HVAC controller, generating a failsafe control signal from the HVAC controller based on satisfaction of a predetermined relationship between the generated state and the stored connection indication, and using the failsafe control signal to control the heating, ventilating or air conditioning system if the predetermined relationship is satisfied.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

FIGS. 2A and 2B illustrate isometric diagrams of an exemplary control system comprising an exemplary boiler controller together with an exemplary multi-sensor component such as is illustrated separately in FIG. 2C, the exemplary boiler controller used in accordance with an aspect of the present invention to monitor one or more of a temperature, a pressure and a presence of a medium in a boiler, and further operable to control a burner and a circulation pump associated with the boiler system similar to that of FIG. 1;

FIGS. 5A, 5B and 5D are simplified block diagrams illustrating other embodiments of exemplary HVAC control systems, and FIG. 5C is a table of a corresponding predetermined relationship between the generated state and the stored connection indication, in accordance with another embodiment;

DETAILED DESCRIPTION OF THE INVENTION

Figure 1:
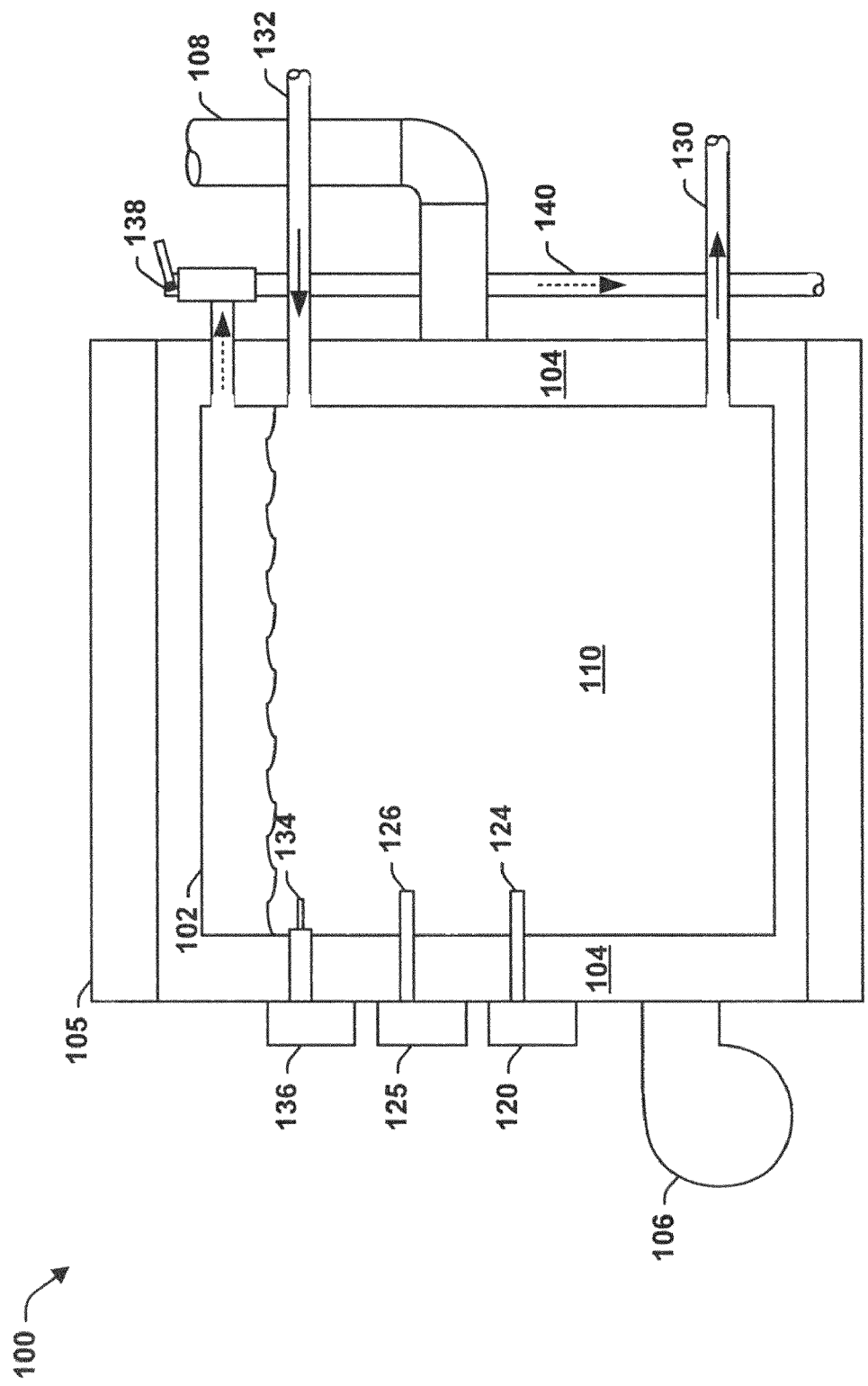
FIG. 1 is a simplified diagram of a prior art hot water boiler system using separate conventional medium temperature, pressure and presence detecting sensors and controllers for monitoring and controlling the various properties of the boiler.

The present invention will now be described with reference to the attached drawings, wherein like reference numerals are used to refer to like elements throughout. The invention relates to an HVAC control system and an HVAC controller and method used for receiving failsafe data and controlling various medium properties or conditions associated with the HVAC control system such as a boiler control system or another such heating, ventilating or air conditioning system in a failsafe manner.

In one embodiment, the HVAC control system of the present invention provides failsafe control in the HVAC control system used for receiving and controlling various properties (e.g., temperature, pressure, presence of the medium) of an object or medium in a heating, ventilating or air conditioning system, including an oil, gas, wood or pellet burning furnace or an electric heater or furnace. The HVAC control system comprises an HVAC controller configured for receiving failsafe data indicative of a safety related property of an object or medium, for example using a failsafe detector, and is also configured to generate a state indicative of a connection status of the failsafe detector with respect to the HVAC controller.

The HVAC controller may also be configured to detect a failure in the failsafe detector and to generate a failure indication therefrom. The HVAC control system further comprises a non-volatile memory (or another such storage device) operably coupled to the HVAC controller and configured to store a connection indication indicative of a connection status of the failsafe detector with respect to the HVAC controller. The HVAC controller is also configured to generate a control signal (e.g., output) from the HVAC controller based on satisfaction of a predetermined relationship between the generated state and the stored connection indication, and also based on the failure indication.

One goal of the HVAC control system of the present invention is to ensure that once a failsafe detector has been detected as being connected and functioning under control of the HVAC controller, that the failsafe detector can not be arbitrarily removed from the control capability of the HVAC controller without a safe shut-down of the system, thereby avoiding an unsafe condition and/or an impending system failure. Another goal of the HVAC control system of the present invention is to ensure that if the HVAC controller detects a failure in the failsafe detector, that a safe shut-down of the HVAC control system will occur, thereby avoiding an unsafe condition and/or an impending system failure. To accomplish this safe shut-down, the control signal generated by the HVAC controller may be effectively disabled from controlling one or more functions of the heating, ventilating or air conditioning system, either because the predetermined relationship was not satisfied, or because of the results of the failure indication.

In one embodiment, the generated state indicative of a connection status of the failsafe detector with respect to the HVAC controller comprises one of a first state indicating a connection status, wherein the failsafe detector is connected to the HVAC controller, and a second state indicating a connection status wherein the failsafe detector is not connected to the HVAC controller. For example, a "1" state may be generated by the HVAC controller to indicate that the failsafe detector is connected to the HVAC controller, while a "0" state may be generated by the HVAC controller to indicate that the failsafe detector is not connected to the HVAC controller.

In another embodiment, the stored connection indication indicative of a connection status of the failsafe detector with respect to the HVAC controller, comprises one of a first state indicating a connection status wherein the failsafe detector is connected to the HVAC controller, and a second state indicating a connection status wherein the failsafe detector is not connected to the HVAC controller. For example, the HVAC controller may store a "1" state in the non-volatile memory to indicate that the failsafe detector is connected to the HVAC controller, while the HVAC controller may store a "0" state in the non-volatile memory to indicate that the failsafe detector is not connected to the HVAC controller. Alternately, it will be appreciated that the "1" and "0" state indications may be reversed.

In yet another embodiment, the HVAC controller is configured to receive and store a connection indication in the non-volatile memory, provided by either factory programming the connection indication in the non-volatile memory, or by the HVAC controller automatically sensing and generating a state indicative of a connection status of the failsafe detector with respect to the HVAC controller, thereby automatically sensing and/or determining whether the failsafe detector is or is not connected to the HVAC controller.

In one embodiment, the control signal is used to control multiple functions of the heating, ventilating or air conditioning system if the predetermined relationship was satisfied, or if a failure is detected in the failsafe detector.

In order to better appreciate one or more features of the invention, several exemplary implementations of the HVAC controller and method for providing failsafe control and upgrades to a control system used for detecting and controlling various object or medium properties in heating, ventilating and air conditioning systems are presented. The HVAC controller and method for failsafe control in an HVAC control system are hereinafter illustrated and described in association with the following figures.

FIG. 1 illustrates a prior art hot water boiler system 100, wherein a conventional temperature sensing controller devices are used for monitoring and controlling the various properties of the boiler system. The prior art boiler system, for example, uses separate medium temperature and pressure detecting sensors and controllers for monitoring and controlling the respective properties of the boiler, and a separate conventional low-water cut-off detector and controller is used to detect the presence of water in the boiler for safe operation thereof. Numerous types of temperature and pressure sensing devices or sensors are utilized in such boiler or HVAC control systems, including those based on thermocouples, thermistors, and fluid filled copper bulbs to help regulate the temperature and level of water within the boiler.

The conventional boiler 100 of FIG. 1 comprises a boiler tank 102 surrounded by an insulating material layer 104 within a boiler enclosure 105. A burner 106 having a flue vent 108, heats water 110 (or a water/glycol mix) within the tank 102 to a temperature set by a temperature sensing control device 120. The temperature sensing control device 120 has, for example, a fluid filled copper bulb 124, which expands when heated to actuate a high/low limit module for control of the system about a temperature set-point. The heated water 110 is circulated through a feed water line 130 out to an external heat exchanger (not shown) and the cooled water returns to the boiler 100 through a supply/return line 132. If the level of the water 110 within the boiler tank 102 drops below the level of a live probe 134 of a low-water cut-off device 136, the burner 106 is shut-down until more water 110 is added to the boiler 100 to maintain safe operation by avoiding boiler damage.

In addition, the boiler 100 may further comprise a water pressure sensor 125 utilizing a pressure sensing bulb or diaphragm 126 operable to sense the pressure of the water 110 within the tank 102. The pressure sensor 125, for example, may then use the detected pressure, to safely control a shut-down of the boiler in the event of an over-pressure condition, and to avoid dumping water through a pressure relief valve 138 and discharge line 140 onto the floor of the boiler room.

Thus, in the conventional boiler system configuration 100, the separate water temperature and pressure sensing, and water presence detection and associated controllers may all be required for operation in a safe manner, which is understood in the art as "failsafe operation".

The HVAC sensors discussed above are generally individually fabricated, packaged and mounted with associated controllers. However, in many applications, several specific sensors are commonly used together with a controller. For example, in the case of boiler heating systems, a boiler water temperature sensor is usually accompanied by a low-water cutoff detector, which senses the presence of the water (or another such medium) when strategically placed at the low water level of the boiler. If the water falls below this level, the system may be shut-down until more water is added and immerses the sensor again within the medium. In addition, pressure relief valves are usually included in boiler systems to relieve over-pressure conditions such as in the event the boiler overheats producing steam and an excessive pressure build-up. Thus, a pressure sensor would be useful to monitor for such unsafe conditions, and to provide failsafe operation particularly if the water falls below the low water level.

Figure 2D:
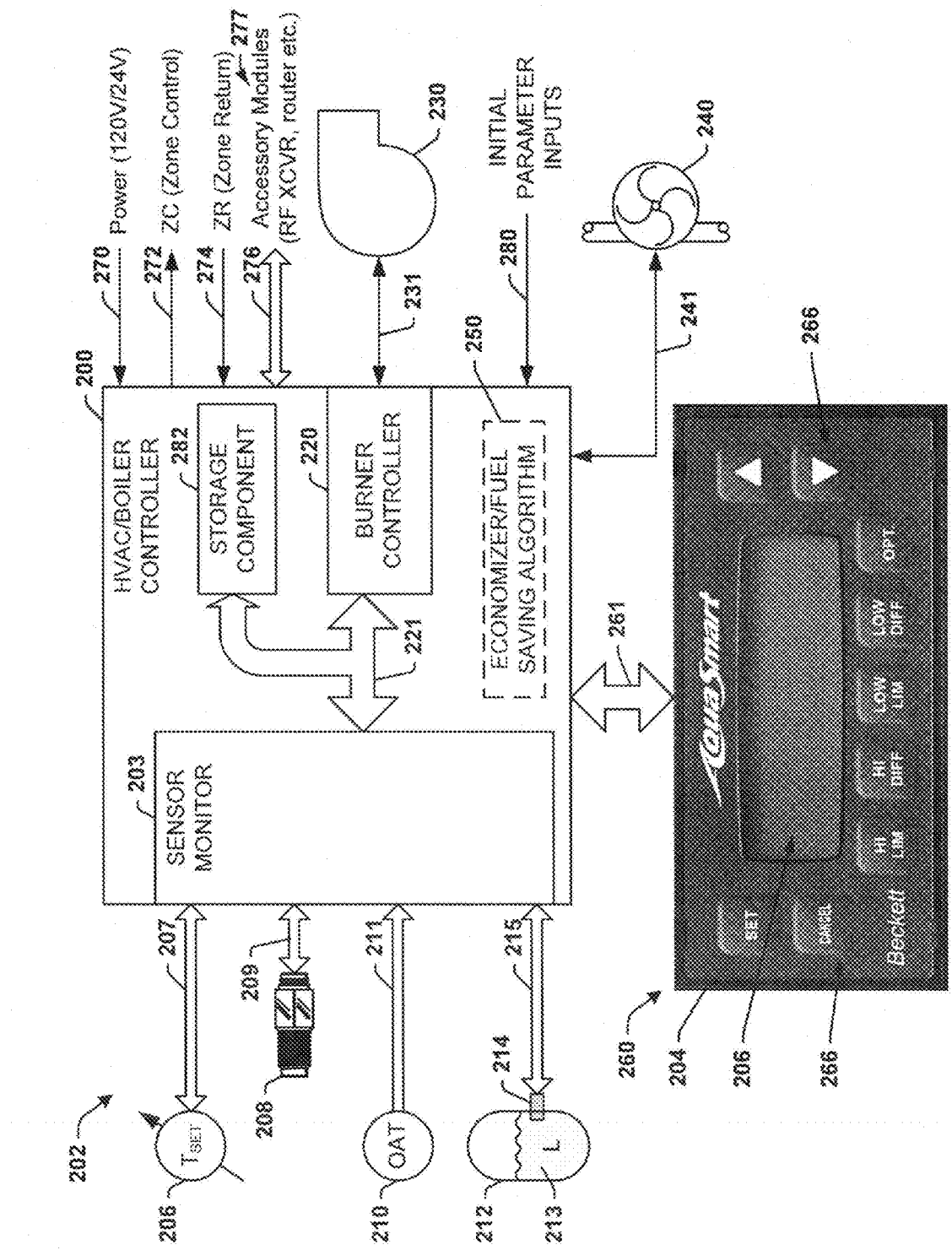
FIG. 2D illustrates a simplified diagram of an exemplary boiler control system comprising a boiler controller such as that of the boiler controller of FIGS. 2A-2B used in accordance with an aspect of the present invention, the boiler control system adapted to couple to a temperature detector, a pressure detector, a thermostat or temperature sensor, an outdoor temperature sensor, a fuel tank level sensor, an accessory port, a user interface, a burner and a circulation pump.
Figure 3:
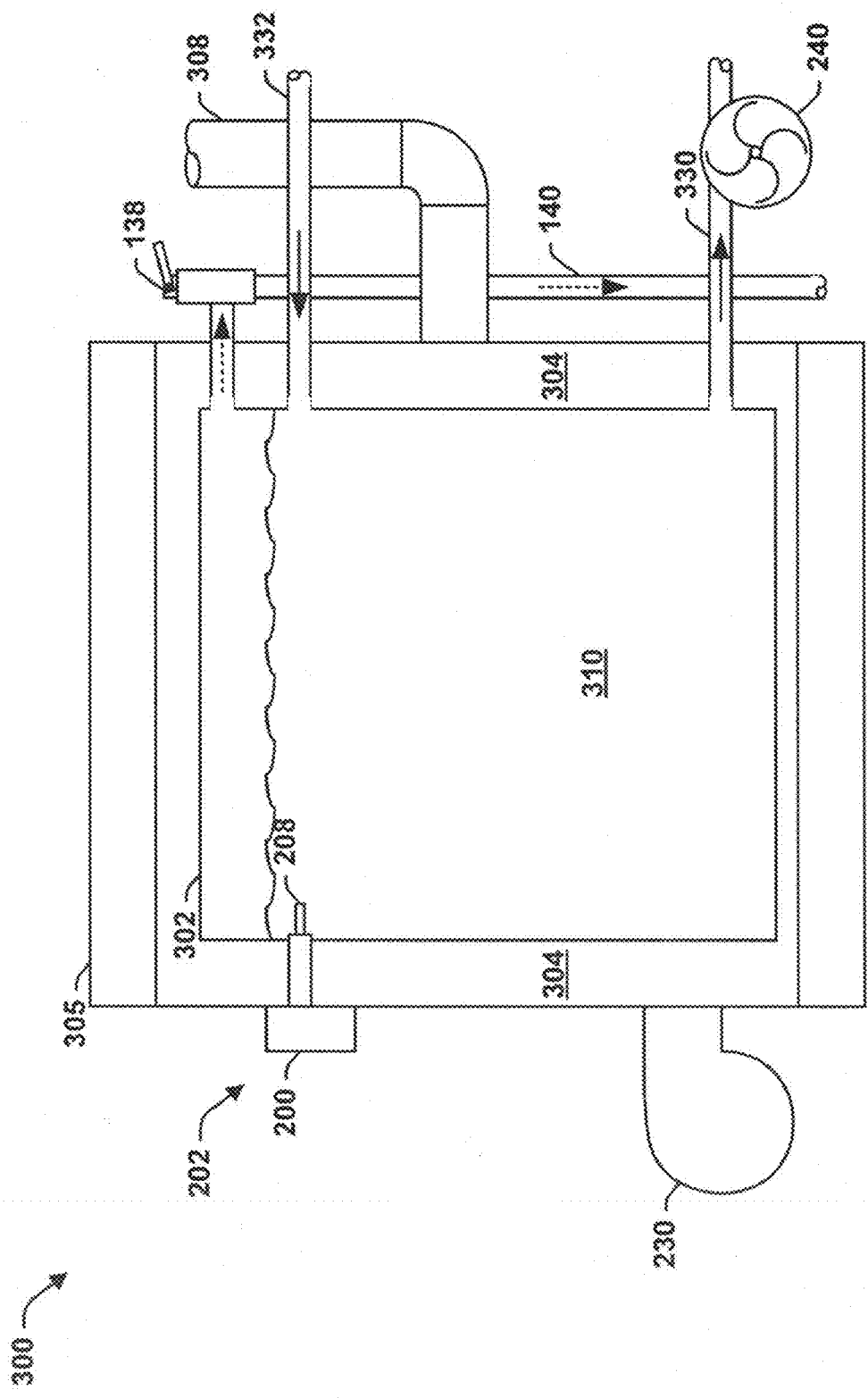
FIG. 3 is a simplified diagram of an exemplary hot water boiler system using a single boiler controller and associated multi-sensor component for monitoring various properties such as a temperature and pressure of the water and for detecting the presence of the water in the boiler, the functions provided together in a single boiler controller and failsafe multi-sensor component.

FIGS. 2A and 2B illustrate isometric diagrams of an exemplary HVAC controller 200 and an exemplary multi-sensor component 208, for example, as is illustrated separately in FIG. 2C, together comprising one embodiment of an HVAC control system 202 such as may be used in the boiler system (boiler) 300 of FIG. 3. The exemplary multi-sensor component 208 is also known herein as TPPS 208, to represent the temperature, pressure and presence sensor functions which this device may perform within a single device housing. The exemplary HVAC controller 200 may be used in accordance with one aspect of the present invention to monitor one or more of a temperature, a pressure and a presence of a medium in a boiler 300, and is further adapted to control a burner 230 and a circulation pump 240 associated with the boiler 300 similar to that of HVAC control system 202 of FIGS. 2D and 3, illustrated and described further hereafter.

HVAC controller 200 of FIGS. 2A and 2B further comprises a controller housing or case 204 for protection of the controller 200 and a user interface comprising a display 206 configured, for example, to display alphanumeric characters, representing one or more temperature and pressure measurements, and temperature set-points associated with the boiler 300. HVAC controller 200 may further comprise a thermostat input port 207 for connection to a thermostat located in a heated zone associated with the boiler 300. The exemplary HVAC controller 200 also may have a communications or bus port 205, such as a 4 wire serial bus port to digitally communicate with one or more or a combination of wired and wireless accessory modules, an RF transceiver, a router, a remote display, a low-water cut-off alarm, an outdoor temperature sensor, a fuel tank level sensor, a POTs modem, a zone temperature sensor, and a thermostat.

As can also be seen in FIG. 2C, the exemplary multi-sensor component 208, for example, may be threaded into the boiler tank (e.g., 302 of boiler 300 of FIG. 3), while the HVAC controller 200 may be mounted onto sensor TPPS 208, and the case 204 of HVAC controller 200 secured to the exterior of the boiler enclosure (e.g., 305 of boiler 300 of FIG. 3). In this way, TPPS 208 is adapted to make direct contact with the medium (e.g., medium 310, water, water-glycol mix within the boiler 300). TPPS 208, for example, may then utilize a modular plug to electrically interconnect the sensor/detector functions into the HVAC controller 200 as shown in FIG. 2D.

FIG. 2D further illustrates a simplified diagram of an exemplary HVAC control system 202 comprising an HVAC controller 200 such as that of the HVAC controller 200 of FIGS. 2A-2B which may be used in accordance with an aspect of the present invention. The HVAC controller 200 comprises a sensor monitor or sensor monitoring component 203 for monitoring or measuring and receiving various medium or object properties of an HVAC system associated with respective sensor/detector inputs. One or more of these properties monitored and received by the HVAC controller 200 may be safety related properties.

For example, the monitoring component 203 of HVAC controller 200 may be coupled to sensor TPPS 208, which may include one or more of a temperature detector, a pressure detector and a presence detector, and is operable to communicate a TPPS signal 209 to the monitoring component 203 of HVAC controller 200. The sensor monitoring component 203 of HVAC controller 200 may also be coupled to a thermostat and/or temperature sensor 206 operable to communicate a temperature signal 207 to the monitoring component 203 of HVAC controller 200, and an outdoor air temperature sensor OAT 210 operable to communicate an outdoor air temperature signal OAT signal 211 to the monitoring component 203 of HVAC controller 200. The monitoring component 203 of HVAC controller 200 may also be coupled to a fuel tank level sensor 214 located within a fuel tank 212, and operable to communicate a tank level signal 215 to the monitoring component 203 of HVAC controller 200.

HVAC controller 200 of HVAC control system 202 of FIG. 2D may further comprise a burner controller 220 and a storage component 282. Burner controller 220 is further configured to provide one or more control signals to burner 230 using a control line 231, and is operable to activate the burner 230 to heat the boiler 300, for example, by burning a fuel 213 supplied from fuel tank 212. Sensor and burner data 221, comprising sensor data from the sensor monitoring component 203 and burner data from the burner 230 via burner controller 220, may be stored in or retrieved from the storage component 282.

The burner controller 220 is further operable to determine whether to activate the burner 230 to heat the boiler based upon the sensor and burner data 221 communicated from the sensor monitoring component 203, the burner 230, or the storage component 282 of HVAC controller 200. For example, the burner 230 may be activated, for example, based upon: the temperature of the medium 310 as measured by the temperature detector 208 as compared to a range of temperature set-points, energy efficiency calculations based on data (e.g., 221 and 209) from the temperature of the medium 310 and a system duty cycle, and a presence of the medium 310 and a pressure of the medium 310. The burner controller 220 is further configured to disable the burner 230 and issue an overpressure alarm when an overpressure condition within the boiler 300 is detected using the pressure measured by, for example, sensor TPPS 208 or a separate pressure detector (e.g., 125/126).

In one embodiment, the HVAC controller 200 may further comprise an economizer algorithm 250 or fuel saving algorithm 250 to assist the burner controller 220 in the determination of whether to activate the burner 230 to heat the boiler 300. For example, the economizer algorithm 250, in addition to utilizing the sensor and burner data 221, may compute the most energy efficient set-point temperature for the boiler 300 based on one or more of a duty cycle of the thermostat and/or the boiler temperature thermal decay rate (boiler time constant, boiler TC or system duty cycle), the outdoor air temperature signal OAT 211, and/or a zone air temperature or a hot water heater temperature.

In one embodiment, the economizer algorithm 250 seeks to find the lowest practical boiler temperature which still permits the thermostats to be satisfied, or it may also seek to achieve a 50% system duty cycle. Often, when a boiler is properly sized, the 50% system duty cycle achieves a good balance of typical losses and gains in the boiler system. For example, the energy efficiency calculations may seek to minimize such losses as stack losses due to heat carried up the chimney, pre-purge losses incurred while flushing air/fumes/gasses from the combustion chamber before fuel ignition, or to lower the variation or change in the regulated zone temperature (delta-T). Thus, in one embodiment, the boiler controller saves energy/fuel by seeking the lowest boiler set-point temperature and eliminates the need for additional and relatively costly medium presence detection (e.g., low-water cut-off) devices and controls (e.g., related relays, power supplies, and microprocessors) currently used in conventional boiler/HVAC systems (e.g., boiler 100 of FIG. 1).

The HVAC controller 200 of the HVAC control system 202 may further comprise a power input 270 such as a 120 VAC or 24 VDC power input. The HVAC controller 200 is configured to measure the line voltage from the power input 270, and to control a shut-down of the burner (to a standby condition), for example, if the 120 VAC line voltage drops below a predetermined voltage such as 72V for a predetermined time period such as 5 seconds, or drops below a second predetermined voltage such as 78V for a second predetermined time period such as 20 seconds.

The HVAC controller 200 of the HVAC control system 202 may also include a zone control ZC 272 output for controlling zone system relays/valves, and a zone return ZR 274 input from the zone system. ZC 272 is energized if the medium temperature is above the low limit and allows a zone to recognize a call for heat (CFH). ZR 274 is energized from a zone that has a ZC signal and a call for heat.

The HVAC controller 200 of the HVAC control system 202, may further include an accessory port 276, for example, comprising a serial bus coupled to a variety of accessory modules 277 such as an RF transceiver, a router (e.g., 710 of FIG. 7), a remote display (e.g., 260a of FIG. 7), a low-water cut-off alarm (e.g., 208 of FIG. 7), an outdoor temperature sensor 210, a fuel tank level sensor 214, a POTs modem (e.g., 714 of FIG. 7), a zone temperature sensor, and a thermostat 210.

For example, the RF transceiver accessory module 277 may be used for wirelessly communicating with one or more or a combination of a zone air temperature located within the zone heated by the boiler 300, wherein the zone air temperature is operable to provide a temperature indication associated with the heated zone, a hot water heater temperature associated with a hot water heater, and a thermostat (e.g., 206) located within the zone heated by the boiler 300, wherein the thermostat is operable to provide a temperature indication associated with the heated zone. The RF transceiver accessory module 277 may also be used for wirelessly communicating with an outdoor temperature detector (e.g., 210) operable to measure an outdoor air temperature associated with the boiler 300, and a tank level detector 214 operable to measure a fuel level of a fuel 213 in a fuel tank 212 associated with the boiler 300. It will be appreciated that such communications between the HVAC controller 200 and any of the accessory modules 277 may also be digitally communicated either by wired or wireless means.

The HVAC controller 200 of the HVAC control system 202 is also adapted to be coupled by way of a control line 241, for example, to a circulation pump 240 for circulating the heated medium 310 via feedwater line (e.g., 330 of FIG. 3) to a zone heated by the boiler 300, and for returning the cooled water via supply/return line 332 back to the boiler 300. Control line 241 may be used to energize the circulation pump 240, or may also be used to communicate a pump failure indication from the circulation pump 240 back to the HVAC controller 200.

The HVAC controller 200 of the HVAC control system 202 is also adapted to be coupled to a user interface 260 by way of a user interface bus 261. The user interface 260 is affixed on or within the controller case 204 for housing and protection of the user interface 260. The user interface 260, for example, may comprise a display 206 configured to display alphanumeric characters, for example, representing one or more temperature and pressure measurements, and temperature set-points associated with the HVAC control system 202. The user interface 260 also comprises a plurality of pushbuttons 266 for inputting and changing the set-points, for selecting one or more operational modes of the HVAC controller 200, and for configuring one or more options of the HVAC controller 200.

The HVAC controller 200 is also configured and operable to receive one or more initial parametric inputs 280 provided by the manufacturer. For example, these initial parametric inputs 280 may include one or more of a low limit and high limit temperature set-point, a low limit and high limit pressure set-point, a circulation pump exercise time, a circulation pump inactivity time, a circulation pump off delay time, a line voltage minimum and maximum, a boiler set-point temperature, a sensor and controller model number, a sensor and controller serial number, a manufacturing date, a calibration temperature and a calibration pressure.

The HVAC controller 200 of the HVAC control system 202 comprises control circuitry and an algorithm 250, for example, such as may be provided on a PCB, configured and operable to monitor, using the sensor monitor 203, various temperature, pressure, and medium presence signals 209 from TPPS 208, outdoor air temperature signal 211 from OAT 210, a temperature setting signal 207 from thermostat 206, and a tank level signal 215 from tank level sensor 214, thereby providing the sensor data of the sensor and burner data 221. The HVAC controller 200 is then configured and operable to use the sensor and burner data 221 from the sensor monitor 203, the set-points entered by the user interface 260, and/or data from the accessory modules 277, and/or initial parameter inputs 280, for example, in the economizer algorithm 250 to reestablish a minimal boiler temperature set-point which will provide improved energy efficiency, reduced losses and/or lower zone temperature changes. In response, the burner controller 220 of the HVAC controller 200, for example, regulates the on-time and/or modulates the flame of the burner 230, to achieve the calculated temperature, and may energize the circulation pump 240 to circulate the medium throughout the one or more zones.

FIG. 3 illustrates another embodiment of an exemplary hot water boiler system 300, utilizing a single HVAC controller 200 and an associated multi-sensor component (e.g., TPPS 208) for controlling the boiler system 300 in a failsafe manner in accordance with the present invention. Other such boiler systems, hot water heaters, and HVAC systems may also incorporate the HVAC controller 200 of the present invention to help regulate various operational aspects of the system.

The exemplary boiler 300 of FIG. 3 comprises a boiler tank 302 surrounded by an insulating material layer 304 within a boiler enclosure 305. A burner 230, having a flue vent 308, heats water 310 within the tank 302 to a temperature set by one or more temperature, pressure and presence sensing devices (e.g., TPPS 208). The heated water 310 may be circulated, by way of a circulation pump 240, through a feed water line 330 to an external heat exchanger (not shown) in a zone associated with the boiler 300, and the cooled water returns to the boiler 300 through a supply/return line 332. If the level of the water 310 within the boiler tank 302 drops below the level of the level sensing device or presence sensing device, the burner 306 is shut-down until additional water 310 is added to the boiler 300 to maintain safe operation and avoid boiler damage.

The boiler 300 may further comprise the water pressure sensor (e.g., contained within TPPS 208), which is operable to utilize the detected pressure, to safely control a shut-down of the boiler in the event of an over-pressure condition. In addition, this failsafe shut-down of the boiler 300 avoids dumping water through a pressure relief valve 138 and discharge line 140 onto the floor of the boiler room. In addition, the HVAC controller 200 is configured to disable the burner 230 and issue an overpressure alarm when an overpressure condition is detected within the boiler 300, for example, using the pressure measured by sensor TPPS 208 or a separate pressure detector (e.g., 125/126).

Thus, the HVAC controller 200 may be used to regulate and control the temperature, pressure and level properties of a medium (e.g., water, water-glycol mix, Freon, ammonia, or alcohol) used in the boiler system 300, a hot water heater, or another such HVAC system, and to control the functions provided together in a single HVAC controller 200 for the HVAC control system 202. It will be appreciated that one or more of these properties may be safety related properties as monitored by sensor TPPS 208 and received by the HVAC controller 200, for example.

Figures 4A, 4B:
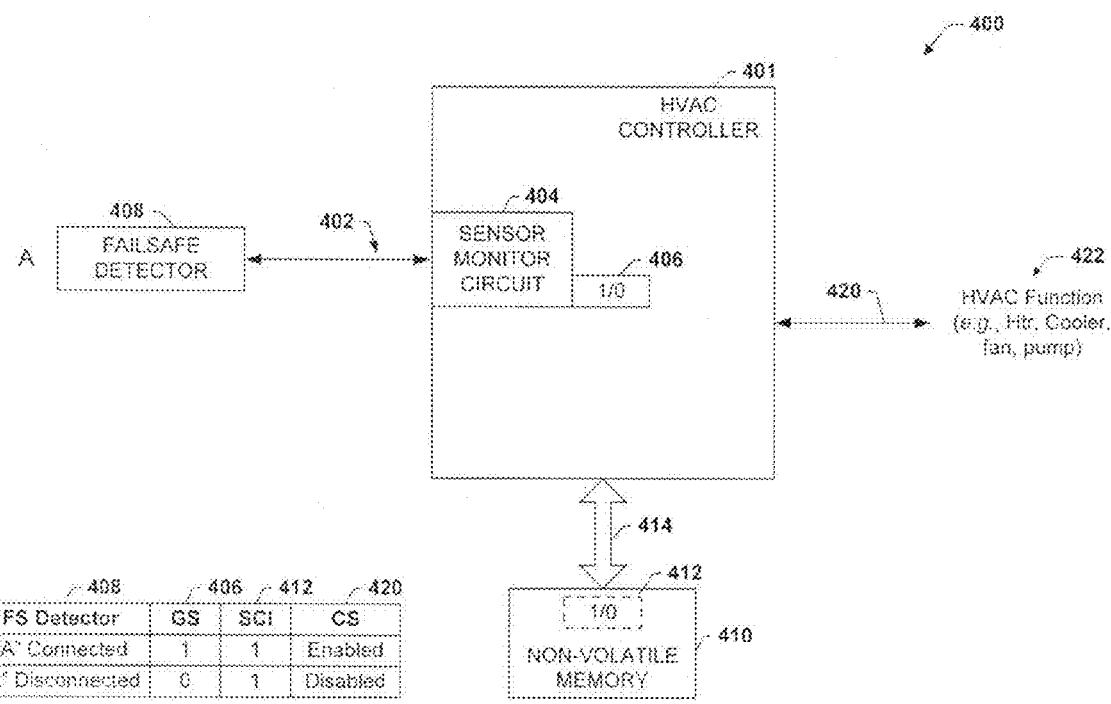
FIG. 4A is a simplified block diagram of an equivalent circuit of an exemplary HVAC control system such as may be used in the control systems of FIGS. 2A, 2B and 2D and 3 of the present invention, the control system adapted to receive failsafe data indicative of one or more safety related properties of an object or medium, configured to generate a state indicative of a connection status of a failsafe detector, such as the detector of FIG. 2C with respect to an HVAC controller, to store a connection indication indicative of a connection status of the failsafe detector with respect to the HVAC controller, and to generate one or more control signals for the HVAC control system, based on satisfaction of a predetermined relationship such as that of the table of FIG. 4B between the generated state and the stored connection indication, in accordance with one embodiment.

FIG. 4A illustrates a simplified block diagram of an equivalent circuit for an exemplary HVAC control system 400 such as may be used in, or in replacement of the HVAC or Boiler control systems 202 of FIGS. 2A, 2B, 2D and 3 in accordance with one or more embodiments.

The control system 400 of FIG. 4A comprises an HVAC controller 401 adapted to receive failsafe data 402, such as from a failsafe (FS) detector 408 (e.g., failsafe detector 208 of FIG. 2C), the failsafe data 402 indicative of one or more safety related properties of an object or medium. The HVAC controller 401 is also configured to generate a state (GS) 406 (e.g., "1" or "0") indicative of a connection status (e.g., connected or not connected) of the failsafe detector 408 with respect to the HVAC controller 401. The safety related properties of the object or medium may include, for example, one or a combination of a low medium level, a pressure, a temperature, a freeze indication, a flow, a flow rate, a specific gravity, a PH, and a carbon monoxide level. It should also be appreciated that the failsafe detector discussed herein, need not only monitor safety related properties to be considered a failsafe detector, but instead is defined herein as a detector that monitors one or more safety related properties of the object or medium being regulated/controlled. In this sense, a failsafe detector monitors and generates failsafe data, without which, the HVAC system may operate in an unsafe manner.

For example, a generated state GS 406 of "1" may indicate a connection status wherein the failsafe detector 408 is connected to the HVAC controller 401, while a generated state GS 406 of "0" may indicate a connection status wherein the failsafe detector 408 is not connected to the HVAC controller 401.

Alternately, the generated states of "1" or "0" may be reversed and thereby a generated state GS 406 of "1" may indicate that the failsafe detector 408 is not connected to the HVAC controller 401, while a generated state GS 406 of "0" may indicate that the failsafe detector 408 is connected to the HVAC controller 401.

The control system 400 of FIG. 4A further comprises a non-volatile memory 410, operably coupled 414 to the HVAC controller 401 and configured to store a connection indication 412 (e.g., "1" or "0") indicative of a connection status (e.g., connected or not connected) of the failsafe detector 408 with respect to the HVAC controller 401. The HVAC controller 401 is also configured to generate a control signal (CS) 420 (e.g., for controlling various functions 422 of the HVAC control system 400), based on satisfaction of a predetermined relationship between the generated state GS 406 and the stored connection indication (SCI) 412. FIG. 4B, for example, illustrates a table of exemplary predetermined relationships between the generated state GS 406 and the stored connection indication SCI 412, in accordance with one aspect of the present invention.

In one or more embodiments, the failsafe data 402 received by the HVAC controller 401, may be received and monitored by a sensor monitor circuit 404 configured to generate the state GS 406 indicative of a connection status of the failsafe detector 408 with respect to the HVAC controller 401.

Moreover, in one embodiment, once the failsafe detector 408 is connected to the HVAC controller 401 and is providing failsafe data 402 to the HVAC controller 401, a state 406 is generated that indicates a connection status that the failsafe detector 408 is connected to the HVAC controller 401. In one embodiment, this state 406 may be stored as a stored connection indication SCI 412 within the non-volatile memory 410. Thereafter, if the failsafe detector 408 is, for example, inadvertently removed or if the failsafe data 402 fails to be received by the HVAC controller 401, the predetermined relationship between the generated state GS 406 and the stored connection indication SCI 412 may not be satisfied. Then, if it is determined that the predetermined relationship is not satisfied, the control signal CS 420 either will not be generated, or the control signal may be generated in such a manner so as to communicate this unsatisfied condition. For example, the control signal CS 420 may initiate or otherwise control a safe shut-down of the HVAC system connected to the HVAC controller 401.

The exemplary predetermined relationships of FIG. 4B, for example, illustrate in the first row of the table that if the generated state GS 406 is a "1" and the stored connection indication SCI 412 (in memory 410) is also a "1" state, that the control signal CS 420 will be enabled. FIG. 4B also illustrates in the second row of the table that if the generated state GS 406 is a "0" and the stored connection indication SCI 412 is a "1" state, that the control signal CS 420 will be disabled. Alternately, as these are only exemplary predetermined relationships, the enabled and disabled results of the control signal CS 420 can also be reversed or can be programmed to achieve any other desired result. In addition to the illustrated enabled and disabled results of the control signal CS 420 of FIG. 4B, the control signal 420 may also be operable to provide an encoded or modulated signal, for example, used to control any HVAC function such as a heater, cooler, fan or pump.

In another embodiment, the stored connection indication SCI 412 may be factory programmed into the non-volatile memory. That is, it is predetermined at the factory what the connection status between the failsafe detector FS 408 and the HVAC controller 401 should be. Therefore, the stored connection indication SCI 412 indicative of this predetermined connection status would also be known and may be pre-programmed into the non-volatile memory at the factory. Thereafter, as a state is generated indicative of a present connection status between the failsafe detector FS 408 and the HVAC controller 401, a comparison, or a logical or mathematical operation may be performed on the generated state GS 406 and the stored connection indication SCI 412 to determine, for example, if the predetermined relationship is satisfied, if the present connection status of the failsafe detector matches that of the stored connection indication SCI 412 indicative of the predetermined connection status, or to determine whether they have the same or opposite states. Accordingly, the control signal CS 420 is then generated based on satisfaction of the predetermined relationship between the generated state GS 406 and the stored connection indication SCI 412.

In yet another embodiment, the stored connection indication SCI 412 may be automatically sensed by the HVAC controller 401 at power-up, at an interval, or continuously, for example, and a state generated which is indicative of a connection status of the failsafe detector with respect to the HVAC controller. In this automatic sensing mode, once the connection status indicates that the failsafe detector FS 408 is connected to the HVAC controller 401, this connected status is stored in the non-volatile memory 410 as the stored connection indication SCI 412. Thereafter, as a state is generated indicative of a present connection status between the failsafe detector FS 408 and the HVAC controller 401, the control signal CS 420 is generated based on satisfaction of the predetermined relationship between the generated state GS 406 and the stored connection indication SCI 412. For example, if after detection of the connection of a failsafe detector, it is then determined that the failsafe detector FS 408 is no longer connected to the HVAC controller 401, then the control signal CS 420 may be either disabled, or may be generated in a manner that controls a safe shutdown of the HVAC system coupled to the HVAC controller 401.

In another embodiment, the automatic sensing of the connection status of the failsafe detector 408 with respect to the HVAC controller 401, comprises sensing one or a combination of an analog measurement in the received failsafe data, a digital measurement in the received failsafe data, a unique communications protocol comprising the received failsafe data, a product ID code received along with the failsafe data, and one of a resistance, voltage, current, or continuity between two or more terminals shared between the failsafe detector and the HVAC controller. That is, the connection status of the detector with respect to the HVAC controller may be determined from the failsafe data, the protocol of the data, or from some other electrical sensing means associated with the connection between the detector and the HVAC controller. In addition, as the failsafe detector may be either wired or wirelessly coupled to the HVAC controller 401, the HVAC controller is also adapted to detect whether the failsafe detector is either wired or wirelessly coupled to the HVAC controller 401 and to generate a state indicative of this connection status.

Figure 5A:
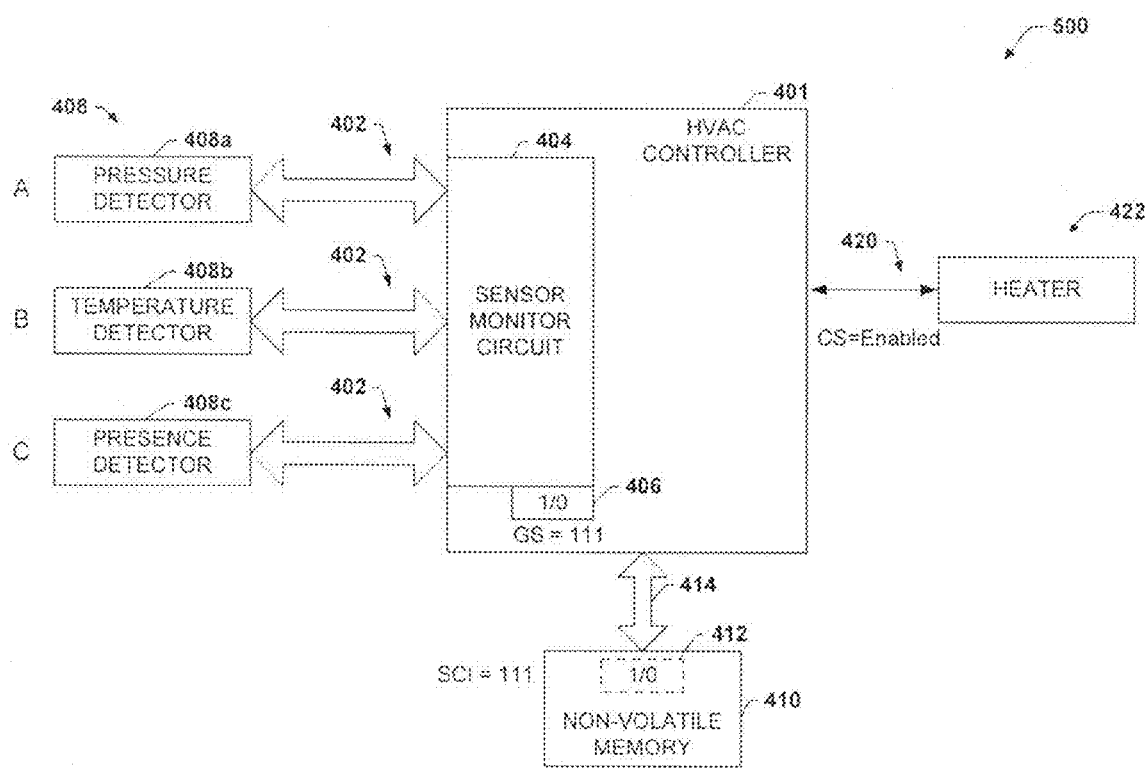
Figure 5D:
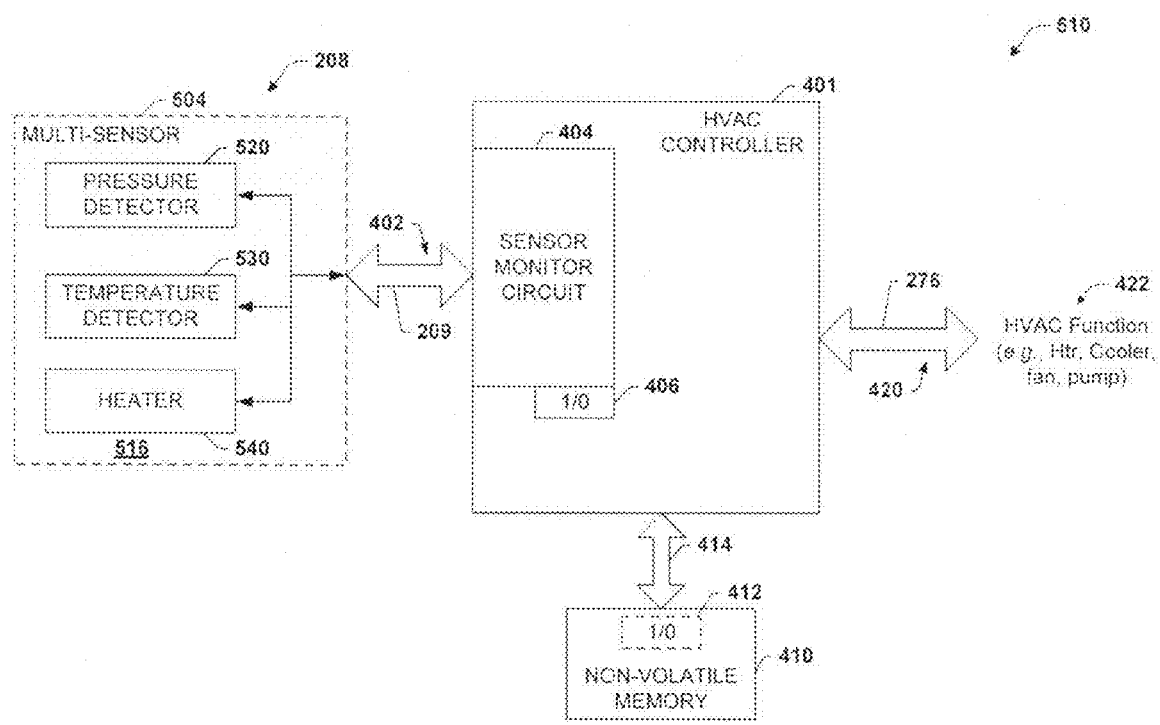

FIGS. 5A, 5B and 5D illustrate simplified block diagrams of other embodiments of an exemplary HVAC control system 500, and FIG. 5C illustrates a table of a corresponding predetermined relationship between the generated state GS 406 and the stored connection indication SCI 412, in accordance with an aspect of the present invention.

The exemplary HVAC control system 500 of FIGS. 5A, 5B and 5D, comprising three failsafe detectors 408 (e.g., FS detectors A 408a, B 408b and C 408c of FIGS. 5A and 5B), and FS detector 208, comprising three failsafe detector elements 520, 530 and 540 of FIG. 5D, has similarities to the HVAC control system 400 of FIG. 4A, illustrated with one failsafe detectors 408. Each of the failsafe detectors 408 may detect and generate failsafe data 402 indicative of one or a combination of safety related properties of an object or medium including, for example, a low medium level, a pressure, a temperature, a freeze indication, a flow, a flow rate, a specific gravity, a PH, and a carbon monoxide level.

For example, the illustrated HVAC control system 500 of FIGS. 5A and 5B, again, may be used in or as replacement of the HVAC or Boiler control system 202 of FIGS. 2A, 2B, 2D and 3 in accordance with one or more embodiments.

The control system 500 of FIGS. 5A and 5B comprises an HVAC controller 401 adapted to receive failsafe data 402, such as from one or more failsafe (FS) detectors 408 (e.g., FS detectors A 408a, B 408b and C 408c, or failsafe detector 208 of FIG. 2C), the failsafe data 402 from each of the failsafe detectors 408 (A, B and C) is indicative of one or more safety related properties of an object or medium. The HVAC controller 401 is also configured to generate a state (GS) 406 (e.g., "1" or "0") indicative of a connection status (e.g., connected or not connected) of the failsafe detector 408 with respect to the HVAC controller 401.

In one or more embodiments, the HVAC controller 401 may be further configured to monitor and receive the failsafe data 402 from the one or more failsafe detectors 408 using a sensor monitor circuit 404, which is further configured to generate the state GS 406 indicative of a connection status of each of the one or more failsafe detectors 408 with respect to the HVAC controller 401.

The control system 500 of FIGS. 5A and 5B further comprises a non-volatile memory 410, operably coupled 414 to the HVAC controller 401 and configured to store a connection indication 412 (e.g., "1" or "0") indicative of a connection status (e.g., connected or not connected) of the one or more failsafe detectors 408 with respect to the HVAC controller 401. The HVAC controller 401 is also configured to generate a control signal (CS) 420, for example, for controlling one or more functions 422 of the HVAC control system 500, based on satisfaction of a predetermined relationship between the generated state GS 406 and the stored connection indication SCI 412.

FIG. 5C, for example, illustrates a table of an exemplary predetermined relationship between the generated state GS 406 and the stored connection indication SCI 412. When the exemplary predetermined relationship of FIG. 5C is satisfied, the HVAC controller 401 is adapted to generate the control signal CS 420, in accordance with one aspect.

For example, the upper box of FIG. 5C illustrates the connection status relationships indicated as logical states (e.g., 1 and 0 states) between the generated state GS 406 and the stored connection indication SCI 412, which must be satisfied to generate or enable the control signal CS 420. In this example, all three failsafe detectors A, B and C must be connected to the HVAC controller 401 in order to satisfy this predetermined relationship (e.g., GS 406 must match SCI 412) and to generate the control signal CS 420. FIG. 5A also illustrates this satisfied predetermined relationship. Accordingly, the generated state GS 406 may be represented by a word with a logical value of 111, while the stored connection indication SCI 412 may be represented by another 111 word.

In this example, it is clear to see that GS 406 represented by or with a value of 111 logically matches SCI 412 represented by or with a value of 111, therefore the control signal CS 420 is generated or enabled, for example.

Similarly, the lower box of FIG. 5C illustrates one set of connection status relationships indicated as logical states (e.g., 1 and 0 states) between the generated state GS 406 (e.g., represented by or with a value of 110) and the stored connection indication SCI 412 (e.g., represented by or with a value of 111), which does not satisfy the predetermined relationship (e.g., GS 406 must match SCI 412, GS 406 must have opposite states from SCI 412, or GS 406 must meet some other predetermined relationship to SCI 412) and therefore the HVAC controller 401 either does not generate the control signal CS 420 or otherwise disables the control signal CS 420. FIG. 5B also illustrates this non-satisfied predetermined relationship. In this particular example, failsafe detectors A and B are connected, but failsafe detector C is not connected to the HVAC controller 401 (e.g., GS 406 may be represented by a value of 110), thus, the predetermined relationship (e.g., GS 406 must match SCI 412) is not satisfied (e.g., GS 406 with a value of 110 does not match SCI 412 with a value of 111) and the control signal CS 420, for example, is not generated or is disabled, and the control signal CS 420 or the HVAC controller 401 may be utilized to initiate a safe shut-down of the HVAC control system, for example, until the predetermined relationship is re-established.

Alternately, any other predetermined relationship(s) between the generated state GS 406 and the stored connection indication SCI 412 may be utilized to generate or enable the control signal CS 420. In addition, the satisfaction of the predetermined relationship may be determined by performing a logical comparison, or a logical or mathematical operation on the generated state GS 406 and the stored connection indication SCI 412.

In another embodiment, the HVAC controller (e.g., 401) is also adapted to display an error message on a display (e.g., 260 of FIG. 2D) if the HVAC controller determines that the predetermined relationship between the generated state (e.g., 406) and the stored connection indication (e.g., 412) has not been satisfied.

In one embodiment, the HVAC controller 401 can be configured to detect a failure in the failsafe detector(s) and to generate a failure indication therefrom, and also configured to generate a control signal 420 based on satisfaction of a logical comparison between the generated state 406 and the stored connection indication 412, and also based on the failure indication.

In yet another embodiment, the control signal (e.g., CS420) generated by the HVAC controller (e.g., 401) is configured to be coupled to a circulation pump (e.g., 240 of FIG. 2D), operable to distribute the medium (e.g., 310 of FIG. 3) within a zone heated or cooled by the control system (e.g., 260, 400, 500), based on the control signal (e.g., CS 420).

In still another embodiment, the control signal (e.g., CS420) generated by the HVAC controller (e.g., 401) is configured to be coupled to a burner (e.g., 220 of FIG. 2D), the burner operable to heat one of a furnace and a boiler, based on the control signal (e.g., CS 420).

The HVAC control system 510 of FIG. 5D is similar to the HVAC control system 500 of FIGS. 5A and 5B, but instead comprises the three failsafe detectors combined into one housing 504 as one Failsafe detector 208 of FIGS. 2C, 2D and 5D. Sensor 208 of FIG. 4 comprises a FS pressure detector 520, a FS temperature detector 530, and a FS presence detector which comprises a heater 540 and the FS temperature detector 530 working together in close thermal union. In one embodiment, the sensor 208 of FIG. 5D further comprises the pressure detector 520, the temperature detector 530 and the heater 540 affixed together within a single housing, for example, using a casting or potting material 516 (e.g., silicon rubber, thermal epoxy, or ceramic material) to provide a close thermal union between the two elements. In another embodiment, the pressure detector 520, the temperature detector 530 and the heater 540 may be, for example, affixed, bonded, deposited, or glued together onto a dry side of a substrate (not shown) opposite from a wet side of the substrate that is in contact with the medium (e.g., 310).

The HVAC control system 510 further comprises an HVAC controller 401 adapted to receive failsafe data 402 from the failsafe detector 208, for example, on bus 209. The failsafe data 402 is indicative of one or more safety related properties of an object or medium measured by the failsafe detector 208. The HVAC controller 401 is also configured to generate a state (GS) 406 (e.g., "1" or "0") indicative of a connection status (e.g., connected or not connected) of the failsafe detector 208 with respect to the HVAC controller 401.

In one or more embodiments, the HVAC controller 401 may be further configured to monitor and receive the failsafe data 402 from the one or more failsafe detector 208 using a sensor monitor circuit 404, which is further configured to generate the state GS 406 indicative of a connection status of the failsafe detectors 208 with respect to the HVAC controller 401.

The control system 510 of FIG. 5D further comprises a non-volatile memory 410, operably coupled 414 to the HVAC controller 401 and configured to store a connection indication 412 (e.g., "1" or "0") indicative of a connection status (e.g., connected or not connected) of the failsafe detector 208 with respect to the HVAC controller 401. The HVAC controller 401 is also configured to generate a control signal (CS) 420 on a control signal bus 276, for example, for controlling one or more functions 422 of the HVAC control system 510, based on satisfaction of a predetermined relationship between the generated state GS 406 and the stored connection indication SCI 412.

Figure 6:
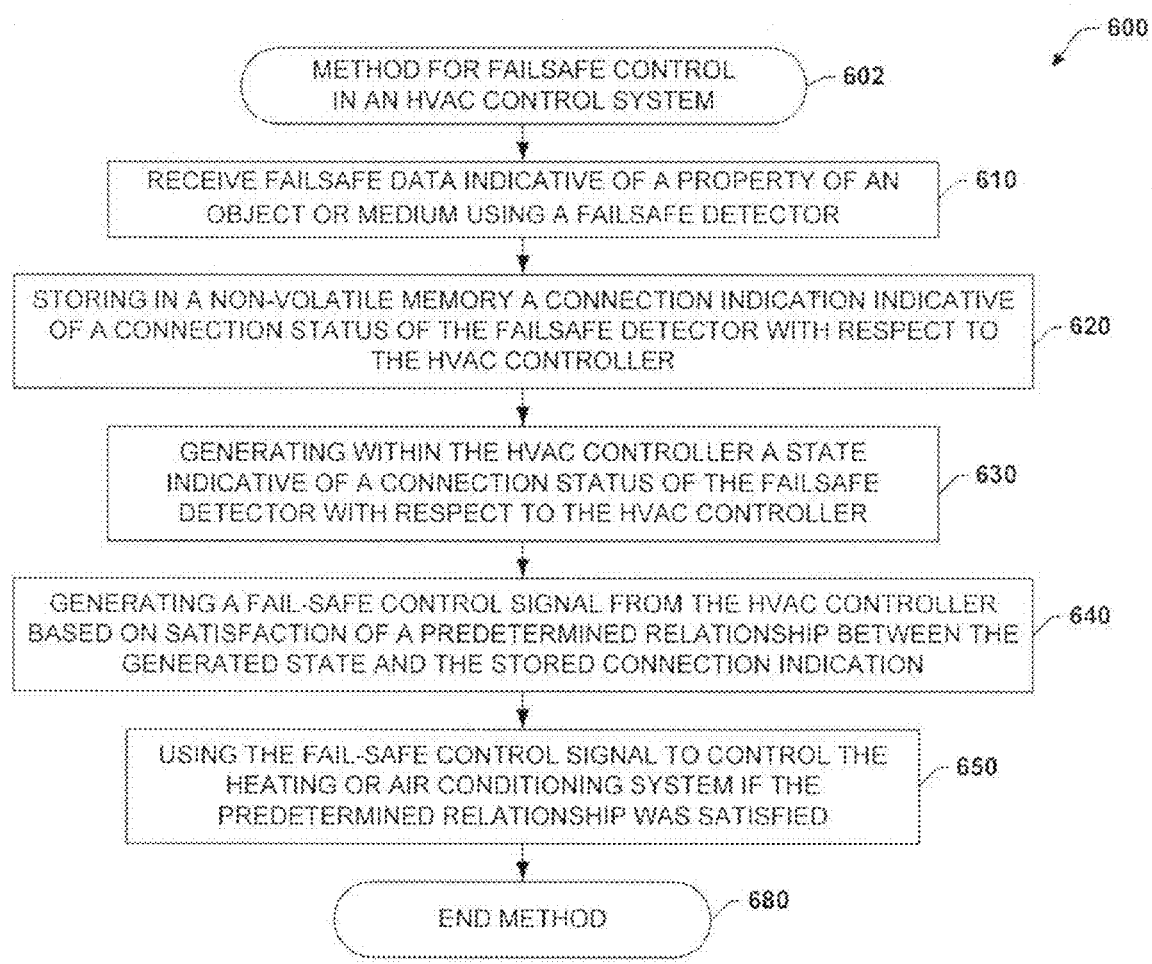
FIG. 6 is a flow diagram illustrating a method for failsafe control in an HVAC control system such as the HVAC control systems of FIGS. 2D, 3, 4A, 5A, 5B and 5D, in accordance with one or more aspects.

FIG. 6 illustrates a flow diagram illustrating a method 600 for failsafe control in an HVAC control system such as the HVAC control system of FIGS. 2D, 3, 4A, 5A, 5B and 5D, in accordance with one or more aspects of the present invention.

While the method 600 is illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the method 600 according to the present invention may be implemented in association with the HVAC control system, the boiler system, and the temperature, pressure and presence detection systems, elements, and devices illustrated and described herein as well as in association with other HVAC systems, elements, and devices not illustrated.

The present invention provides an exemplary method 600 of providing failsafe control in an HVAC controller (e.g., 401) of an HVAC control system (e.g., 202, 400, 500 and 510) used for receiving and controlling one or more failsafe or safety related properties of an object or medium (e.g., 310) in a heating, ventilating or air conditioning system, such as HVAC control system 500.

The method 600 comprises receiving failsafe data (e.g., 402) indicative of a safety related property of an object or medium (e.g., 310) using a failsafe detector (e.g., 208, 408), and storing in a non-volatile memory (e.g., 410) a connection indication (e.g., 412) indicative of a connection status (e.g., "1"=connected, "0"=not connected) of the failsafe detector (e.g., 208, 408) with respect to the HVAC controller (e.g., 401). The method 600 also includes generating within the HVAC controller (e.g., 401), a state (e.g., 406) indicative of a connection status of the failsafe detector (e.g., 408) with respect to the HVAC controller (e.g., 401), and generating a failsafe control signal (e.g., 420) from the HVAC controller (e.g., 401) based on satisfaction of a predetermined relationship (e.g., upper block states 412 of FIG. 5C) between the generated state (e.g., 406) and the stored connection indication (e.g., 412). The method 600 also includes using the failsafe control signal (e.g., 420) to control the heating, ventilating or air conditioning system (e.g., 500) or various elements thereof (e.g., 422), if the predetermined relationship was satisfied.

In one embodiment, the exemplary economizer algorithm or method 600 of FIG. 6 begins at 602, wherein failsafe data (e.g., 402) indicative of a safety related property (e.g., a low medium level, a presence of a medium, a pressure, a temperature, a freeze indication, a flow, a flow rate, a specific gravity, a PH, a carbon monoxide level) of an object or medium (e.g., 310, water, Freon, steam, a heat exchanger of a furnace) is received at 610, for example, using the failsafe detector (e.g., 408, TPPS 208).

For example, a low medium level sensor such as a low water cut-off (LWCO) sensor, such as is used as one portion of a TPPS 208 sensor, may be connected to the HVAC controller 401, and the LWCO sensor may indicate a low water level property of the medium, or may simply indicate when water is present against the sensor. As the presence of water in a boiler is considered to be critical to the safety of a boiler, this presence data received by the HVAC controller is also considered to be failsafe data (e.g., 402) indicative of a safety related property (e.g., a low medium level) of the water medium (e.g., 310), because the boiler could fail if water is not maintained at a safe level.

At 620, the method 600 comprises storing in a non-volatile memory (e.g., 410, flash memory) a connection indication (e.g., 412, "0", "1") indicative of a connection status (e.g., "1"=connected, "0"=not connected) of the failsafe detector (e.g., 208, 408) with respect to the HVAC controller (e.g., 401, boiler, furnace or A/C controller).

For example, an expected connection indication (e.g., 412, "0", "1") may be programmed into the non-volatile memory 410 at the factory. Alternately, in another embodiment, the initial connection status may be automatically detected with the HVAC controller 401, and this connection status automatically programmed into the non-volatile memory 410. That is, in one embodiment, once the LWCO sensor is utilized with the HVAC control system (e.g., 202, 400, 500 and 510), this sensor may be thereafter required to maintain the safe operation of the HVAC controller 401. Accordingly, once the LWCO sensor, or another such safety related sensor has been detected as being connected to the HVAC controller, this expected connection indication (e.g., 412, "0", "1") may be programmed into the non-volatile memory 410 and used for later verification that this failsafe sensor is still connected to the HVAC controller.

At 630, the method 600 also includes generating within the HVAC controller (e.g., 401), a state (e.g., 406) indicative of a connection status of the failsafe detector (e.g., 408) with respect to the HVAC controller (e.g., 401).

For example, if the LWCO sensor TPPS 208 is connected to the HVAC controller (e.g., 401), a "1" state may be utilized to indicate this connection status between the failsafe detector (e.g., 408) and the HVAC controller (e.g., 401). Otherwise, if the LWCO sensor TPPS 208 is not connected to the HVAC controller (e.g., 401), a "0" state may be utilized to indicate this connection status between the failsafe detector (e.g., 408) and the HVAC controller (e.g., 401).

At 640, the method 600 includes generating a failsafe control signal (e.g., 420) from the HVAC controller (e.g., 401) based on satisfaction of a predetermined relationship (e.g., upper block states 412 of FIG. 5C) between the generated state (e.g., 406) and the stored connection indication (e.g., 412).

For example, if it is detected that the LWCO sensor is connected to the HVAC controller (e.g., 401), a state (e.g., 406) indicating the connection status may be generated. Further, if it is predetermined that this LWCO sensor is required to maintain the safe operation of the HVAC controller 401, then a predetermined relationship should be satisfied between the generated state (e.g., 406) and the stored connection indication (e.g., 412). For example, if the predetermined relationship is that the "states be the same", the generated state 406 may be a "1" and the stored connection indication 412 may also be a "1", to satisfy the predetermined relationship. Alternately, if the predetermined relationship is that the "states be opposites of each other", then the generated state 406 may be a "1" and the stored connection indication 412 may be a "0", to satisfy the predetermined relationship. In one embodiment, a simple comparison may be used to determine if this predetermined relationship is satisfied. In another embodiment, a mathematical relationship or some logical relationship may be utilized between the generated state (e.g., 406) and the stored connection indication (e.g., 412) to determine if this predetermined relationship is satisfied.

At 650, if the predetermined relationship was satisfied, method 600 may also include using the failsafe control signal (e.g., 420) to control one or more elements (e.g., 422) of the heating, ventilating or air conditioning system (e.g., 500). For example, the control signal 420 may be used to control one or more of a fan, a burner (e.g., 230) or a pump (e.g., 240) of a heater, a furnace, a ventilator, a cooling system or an air conditioning system.

Thereafter, at 680 the failsafe control method 600 may end, or may also continue back to 602.

In yet another embodiment, the failsafe control method 600 may further comprise sensing and generating a state 406 indicative of a connection status of the failsafe detector 408 with respect to the HVAC controller 401 using the HVAC controller 401 to determine whether the failsafe detector 408 is or is not connected to the HVAC controller 401. For example, this may include performing a logical or mathematical operation on the generated state (e.g., 406) and the stored connection indication (e.g., 412) to determine whether they have the same state or opposite states. The method 600 may also then include enabling the heating, ventilating or air conditioning system (e.g., 400, 500, 510) using the failsafe control signal (e.g., 420) if it is determined that the generated state (e.g., 406) and the stored connection indication (e.g., 412) comprise the same state, and disabling the heating, ventilating or air conditioning system (e.g., 400, 500, 510) using the failsafe control signal (e.g., 420) if it is determined that the generated state (e.g., 406) and the stored connection indication (e.g., 412) comprise opposite states.

Other such similar or related methods are also contemplated within the scope of the present invention.

Figure 7:
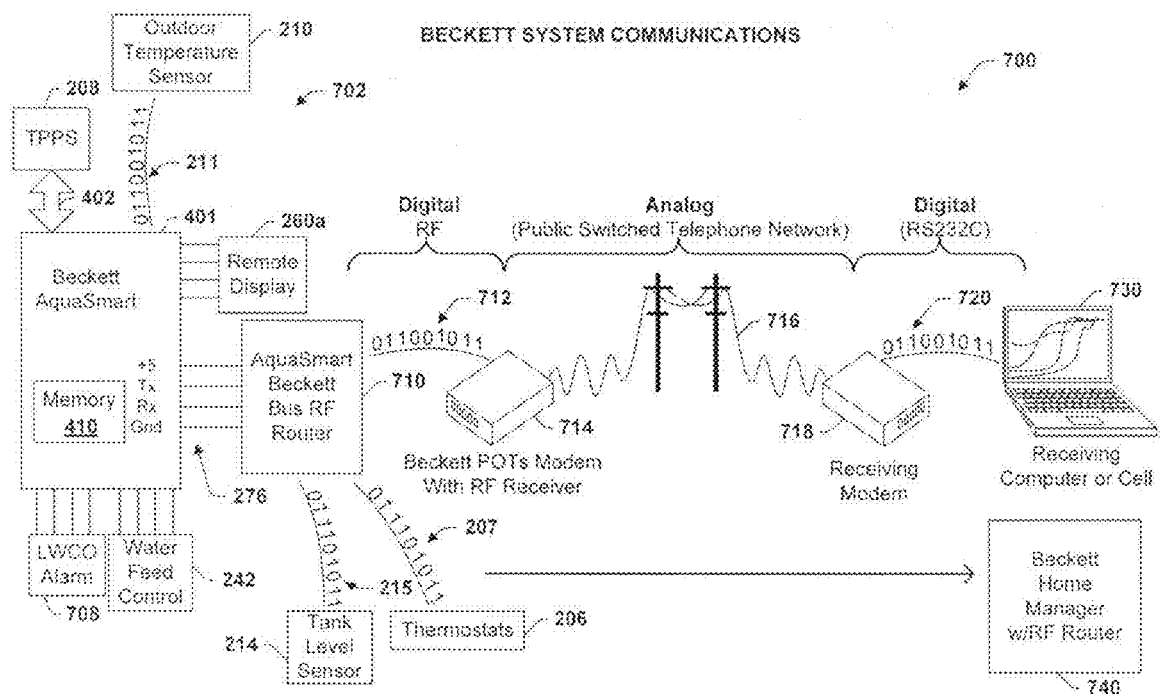
FIG. 7 is a simplified exemplary Beckett system communications diagram, such as may be used by the HVAC controller of FIGS. 4A, 5A, 5B and 5D in accordance with the present invention.

FIG. 7 illustrates a simplified diagram of an exemplary Beckett communications system 700, such as may be used with the HVAC controller (e.g., 200 or 401) of FIGS. 2A, 2B, 2D, 4A, 5B, 5D and 7 in accordance with one or more aspects.

For example, the HVAC control system 702 of the exemplary communications system 700 of FIG. 7, comprises an HVAC controller (Beckett AquaSmart controller) 401, configured to monitor and receive failsafe data 402 indicative of one or more safety related properties of an object or medium, such as the temperature, pressure and presence of a medium, for example, using a TPPS sensor 208. The HVAC controller 401 of the exemplary communications system 700 is also configured to generate a state indicative of a connection status of the failsafe detector (e.g., 208, 408) with respect to the HVAC controller 401. The failsafe sensor 208 and other such sensors may be either wired or wirelessly coupled to the HVAC controller 401, and accordingly, the controller is adapted to detect such a wired or wireless connection status and generate a state indicative of this connection status.

In one embodiment, if after a failsafe detector (e.g., 208, 408) has been operating in the HVAC control system 702, such a connection status will be generated and stored in a non-volatile memory (e.g., 410) of the HVAC controller 401. Thereafter, if the failsafe detector (e.g., 208, 408) either fails or is inadvertently removed from the HVAC controller 401, the respective failure indication or the new generated state 406 indicative of the new connection indication may no longer match the stored connection indication 412 (may no longer satisfy a predetermined relationship). In one embodiment, when this predetermined relationship between the generated state 406 and the stored connection indication 412 can not be satisfied, or the failure indication is generated, a control signal (e.g., 420) from the HVAC controller 401 will either not be generated or will be disabled. In another embodiment, the control signal 420 from the HVAC controller 401 may disable one or more HVAC functions (e.g., 422) coupled to the HVAC controller 401. In this way, the HVAC controller 401 may prevent a safety related failure to the HVAC control system 702.

The HVAC controller 401 may also either wired or wirelessly communicate with an outdoor air temperature sensor OAT 210, a remote operator display 260a, may monitor and control a burner 230 and a circulation pump 240, may monitor and control a water feed control (make-up water supply control) 242, and also provide a low water cut-off alarm (LWCO) 708 as an output to a user alarm system, for example.

In one embodiment, the low water cut-off alarm (LWCO) 708 comprises a device that acts to interrupt power to a burner (e.g., 230) when the presence of the medium or water (e.g., 310) in the boiler (e.g., 300) can no longer be detected. Typically, LWCO 708 may be mounted directly into the boiler at a low water level location, above which the water level is to be maintained.

The communications system 700 may further comprise a bus RF router 710 coupled by way of, for example, a 2 to 8 wire serial bus 276 to the HVAC controller 401. The bus RF router 710 is configured to either wired or wirelessly communicate 207 with one or more thermostats 206 located within one or more heated zones, to either wired or wirelessly communicate 215 with a tank level sensor 214 located on a fuel tank (e.g., 212) associated with, for example, a boiler 300 of the HVAC control system 702, and to either wired or wirelessly communicate 712 with a POTs (plain old telephone)

Modem 714 having an RF receiver. The POTs Modem 714 may be coupled with an analog (or digital) public switched telephone network 716, that is further coupled to a corresponding receiving modem 718 configured to digitally communicate 720 (e.g., via RS232C) with a receiving computer or cell phone 730, for example, at a remote location.

RF wireless communications (e.g., 207, 215 and 712) with the bus RF router 710 may also be communicated with a Beckett home manager 740 having an RF router and may comprise an application on a PC, and may be managed from a remote location by Beckett for monitoring the health of the heating system, the oil level within the fuel tank, thermostat settings, or alarm conditions, for example, by service men or the home owner.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising."

What is claimed is:

1. A control system for a heating, ventilating or air conditioning system, comprising:
    an HVAC controller, configured to generate a connection status of according to sensor data; and
    a non-volatile memory operably coupled to the HVAC controller and configured to store a predetermined connection indication state corresponding to the sensor data, the predetermined connection indication state requiring the presence of a safety related property;
    wherein the HVAC controller is configured to generate a control signal based on the presence of the safety related property in the connection status.

2. The control system of claim 1, wherein the safety related property comprises one or more of:
    temperature measurement data,
    pressure measurement data, and
    presence indication data.

3. The control system of claim 1, wherein the connection status, comprises one of:
    a first state indicating that the safety related property is provided by the detector, and
    a second state indicating that the safety related property is not provided by the detector.

4. The control system of claim 1, wherein the control signal generated by the HVAC controller is coupled to and operable to control one or more of a heater, a furnace, a ventilator, a cooling system, and an air conditioning system.

5. The control system of claim 4, wherein the heater or the furnace comprises one of an oil burner, a gas burner, a wood burner, a pellet burner and a resistive heating element.

6. The control system of claim 1, wherein the satisfaction of the predetermined relationship between the generated state and the stored connection indication, comprises performing a logical or mathematical operation on the generated state and the stored connection indication to determine whether they have the same state or opposite states.

7. The control system of claim 1, wherein the safety related property comprises one or more of a low medium level, a presence of a medium, a pressure, a temperature, a freeze indication, a flow, a flow rate, a specific gravity, a PH, and a carbon monoxide level.

8. The control system of claim 1, wherein the sensor data is received from one or more of:
    a low water cut-off (LWCO) detector, operable to detect and communicate a low water level indication to the HVAC controller,
    a pressure detector, operable to measure and communicate a pressure of a fuel medium to the HVAC controller, and
    a multi-sensor component, operable to measure and communicate two or more properties, wherein at least one of the two or more properties comprises the safety related property.

9. The control system of claim 1, wherein the predetermined connection indication state for the detector is derived from factory programming.

10. The control system of claim 1, wherein the HVAC controller is adapted to display an error message on a display if the HVAC controller determines that the connection status indicates the absence of the safety related property required by the predetermined connection indication state.

11. The control system of claim 1, wherein the control signal generated by the HVAC controller is configured to be coupled to
    a burner controller coupled to a burner, the burner controller operable to determine whether to activate the burner to heat one of a furnace and a boiler, based on the control signal.

12. The control system of claim 1, further comprising a second detector configured to provide second sensor data.

13. The control system of claim 12, wherein the non-volatile memory omits an entry for the second detector.

14. The control system of claim 12, wherein the non-volatile memory is further configured to store a second predetermined connection indication state for the second detector, the second predetermined connection indication state requiring the presence of a second safety related property.

15. A control system for a heating, ventilating or air conditioning system, comprising:
    an HVAC controller configured to receive data from a failsafe detector, wherein the HVAC controller is configured to generate a detector state indicative of a presence of at least one safety related property in the data from the failsafe detector, and wherein the HVAC controller is configured to generate a failure indication on an absence of the safety related property in the data from the failsafe detector; and
    a storage device operably coupled to the HVAC controller and configured to store the at least one safety related property for the failsafe detector.

16. The control system of claim 15, wherein the HVAC controller is coupled to and operable to control one or more of a heater, a furnace, a ventilation system, a cooling system, and an air conditioning system.

17. The control system of claim 15, wherein one of the at least one safety related property, comprises one or more of a low medium level, a presence of a medium, a pressure, a temperature, a freeze indication, a flow, a flow rate, a specific gravity, a PH, and a carbon monoxide level.

18. The control system of claim 15, wherein the failsafe detector comprises a detector adapted to be coupled to the HVAC controller and operable to detect one or more of a low medium level, a presence of a medium, a pressure, a temperature, a freeze indication, a flow, a flow rate, a specific gravity, a PH, and a carbon monoxide level.

19. The control system of claim 15, wherein the HVAC controller is configured to automatically sense and store the safety related property into the storage device.

20. The control system of claim 19, wherein the HVAC controller, comprises sensing one or more of:
  an analog measurement in the received failsafe data,
  a digital measurement in the received failsafe data,
  a unique communications protocol comprising the received failsafe data,
  a product ID code received along with the failsafe data, and
  one of a resistance, voltage, current, or continuity between two or more terminals shared between the failsafe detector and the HVAC controller.

21. The control system of claim 15, further comprising a sensor monitor component configured to monitor system properties, wherein the system properties include the failsafe data.

22. The control system of claim 21, wherein the system properties include a fuel level.

23. A method of providing failsafe control in an HVAC controller of a control system used for receiving and controlling a failsafe property of an object or medium in a heating, ventilating or air conditioning system, the method comprising:
  receiving;
  determining whether the data is indicative of a safety related property for a failsafe detector;
  generating an enabled control signal on a presence of the safety related property; and
  generating a disabled control signal on an absence of the safety related property.

24. The method of claim 23, further comprising:
  receiving second data using a second failsafe detector;
  determining whether the second data is indicative of a second safety related property for the second failsafe detector.

25. The method of claim 23, further comprising retrieving the safety related property for the failsafe detector from a memory component.

26. The method of claim 23, further comprising setting a connection indication status for the detector based on the presence of the safety related property.

* * * * *